Patented May 24, 1932

1,859,705

UNITED STATES PATENT OFFICE

WERNER LANGE, OF DESSAU-ZIEBIGK IN ANHALT, GERMANY, ASSIGNOR TO GENERAL ANILINE WORKS, INC., OF NEW YORK, N. Y., A CORPORATION OF DELAWARE

COMPOUNDS HAVING AN AFFINITY FOR COTTON

No Drawing. Application filed July 8, 1930, Serial No. 466,592, and in Germany July 24, 1929.

My present invention relates to new compounds of generally yellowish appearance and being absorbed by cotton from an aqueous solution. When absorbed from cotton, they may be diazotized on the fiber and coupled with a suitable component to produce a dye on the fiber. In this way, with developers for yellow tints, for example, with pyrazolones, bright yellow tints, fast to washing and to the action of light, are obtainable.

My new compounds being carboxylic acids, probably correspond to the general formula

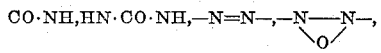

wherein R represents the residue of an aromatic carboxylic acid, or a plurality of such aromatic radicles linked one to another by an atomic linkage of the group consisting of

CO·NH, HN·CO·NH,—N=N—,—N—N—,
\O/ and A represents an atomic linkage of the group consisting of

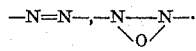

I have found that these new compounds bearing a terminal amino group, are obtainable by a cautious reduction of a carboxylic acid of an aromatic diamino compound in which both amino groups are nitro-benzoylated or in which only one amino group is substituted by a nitrobenzoyl radicle. Finally, I may start from a mononitrobenzoylated aromatic amino nitro compound and I obtain in an analogous manner carboxylic acid compounds of the general formula mentioned above. Generally, the new compounds are feebly colored; they dye cotton directly, can be diazotized and coupled with azo components to form dyes on the fiber.

The following examples illustrate the invention, the parts being by weight:—

*Example 1.*—47.2 parts of sodium 1.4-di-(4'-nitrobenzoylamino)-benzene-2-carboxylate, obtainable by causing 1.4-diaminobenzene-2-carboxylic acid to react with 4-nitrobenzoylchloride, are suspended in water and there is added an excess of sodium hydroxide and 23.5 parts of anhydrous sodium sulfide and the mixture is stirred for some hours at the ordinary temperature. The product of the reaction is pressed and purified by reprecipitation from water.

The product obtained forms in the dry state an orange colored powder, soluble in hot water, to a green-yellow solution. The green-yellow color of the solution poured on blotting paper is not altered when treated with acetic acid, it becomes light yellow by a mineral acid and more reddish by sodium hydroxide. When cooling the solution, the compound is partly separated in form of flakes. Hydrochloric acid precipitates the compound in form of a yellow, gelatinous mass. It dissolves in concentrated sulfuric acid with green-yellow color.

Probably it corresponds to the formula:

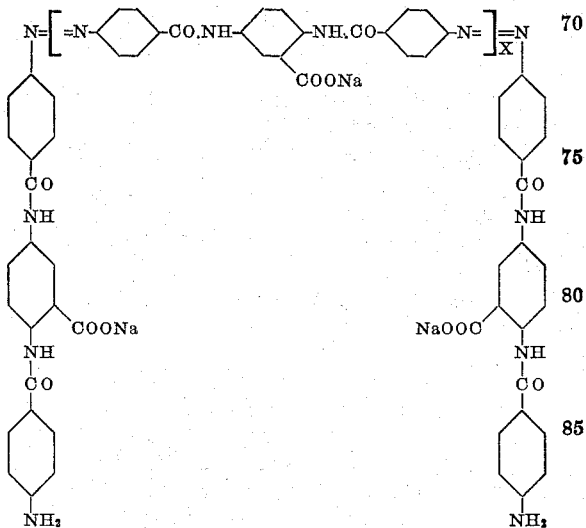

wherein X means 0, 1 or a whole number greater than 1 and wherein —N=N— may be substituted by

The new compound dyes cotton bright yellow and when diazotized on the fiber and coupled with 1-phenyl-3-methyl-5-pyrazolone yields a strong greenish-yellow, which is fast to washing and light.

Instead of sodium sulfide other reducing agents may be used, such as zinc dust and acetic acid.

*Example 2.*—32.3 parts of sodium 1-amino-4-(4'-nitrobenzoylamino)-benzene-2-carboxylate

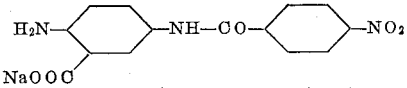

obtainable by condensing 1 molecular proportion of 1.4-diaminobenze-2-carboxylic acid with 1 molecular proportion of 4-nitrobenzoylchloride in the presence of an acid binding agent, are suspended in water and there are added 20 parts of sodium hydroxide solution of 40° Bé. and a solution of 12 parts of anhydrous sodium sulfide. After stirring for several hours at a temperature which is not allowed to rise above 30° C., the product is pressed and purified by reprecipitation from water.

The product obtained forms a brownish powder rather difficultly soluble in water. When cooling, from the solution flakes are separated; by addition of hydrochloric acid greyish yellow flakes are precipitated. The solution poured on blotting paper shows the reactions indicated in Example 1. The solution in concenerated sulfuric acid is yellow.

Probably the compound in form of its sodium salt corresponds to the formula:

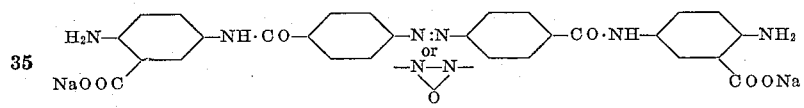

It dyes cotton well a light yellow and yields when diazotized on the fiber and coupled with phenylmethylpyrazolone, a strong yellow.

*Example 3.*—33.1 parts of 1-nitro-4-(4'-nitrobenzoylamino)-benzene-3-carboxylic acid

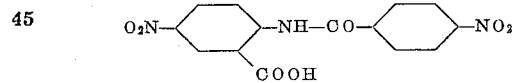

obtainable by condensing 1-aminobenzene-2-carboxylic acid with 4-nitrobenzoylchloride and subsequently nitrating (the melting point of the product is 220–222° C.; the product is nearly insoluble in water and sparingly soluble in alcohol and acetone) are stirred with about 750 parts of water and there are added 100 parts of sodium hydroxide solution of 40° Bé. and 24 parts of anhydrous sodium sulfide. Stirring is continued at room temperature for several hours. After addition of common salt, the product is separated from the solution in the usual manner and purified by reprecipitation from water.

A powder of orange color is obtained easily soluble in hot water to a yellow solution. In the cold the solution gelatinizes. Hydrochloric acid forms a yellow colloidal solution. Poured on blotting paper, it shows the chemical reactions indicated in Example 1. The solution in concentrated sulfuric acid is yellow.

Probably the compound corresponds to the formula

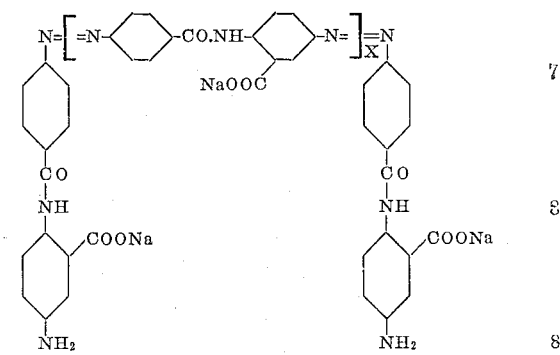

wherein X means 0, 1 or a whole number greater than 1 and wherein —N=N— may be substituted by

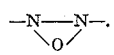

It dyes cotton light yellow and when diazotized on the fiber and coupled with phenylmethylpyrazolone, it yields a reddish yellow, or if coupled with 2-hydroxynaphthalene a scarlet.

My invention is not limited to the foregoing examples nor to the specific details given therein.

Thus, for instance, I may use as a starting material a mono- or di-nitrobenzoylated diamino carboxylic acid of the naphthalene series or a nitro monobenzoylamino derivative of a naphthalene carboxylic acid, a nitrobenzoylated benzidine dicarboxylic acid, a nitrobenzoylated diamino-stilbene dicarboxylic acid, or a nitrobenzoylated diamino diphenyl carbamide dicarboxylic acid. The process of linking together a plurality of these nitrobenzoylated diamino carboxylic acid by a cautious reduction of the nitro group is exactly identical with that indicated in the foregoing examples.

As shown in the examples and the foregoing paragraph, a great number of various starting materials are suitable for being subjected to my reduction process in order to be transformed to new products having an excellent affinity for the chemically unprepared cotton fiber. These starting materials are characterized by the presence of at least one nitrobenzoyl group yielding by a slight reduction the atomic linkage between two or more molecules, and they belong to the benzene and naphthalene series and include such compounds as contain two benzene nuclei, such as diphenyl and stilbene, and such compounds in which two or more benzene nuclei are linked together by an atomic linkage of the group consisting of —HN—CO—NH—,

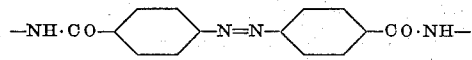

and

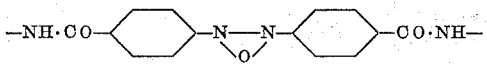

In the following claims the term "a compound of the benzene series" is intended to include such possibilities.

What I claim is:—

1. As new products the compounds which have an affinity for cotton, are diazotizable on the fiber and are carboxylic acids of compounds of the general formula:

H₂N—R—NH—OC—phenyl—A—phenyl—CO—NH—R—NH₂ wherein R represents a radicle of a compound of the benzene series or a radicle of the naphthalene series, and A represents an atomic linkage of the group consisting of —N=N— and

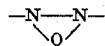

2. As new products the compounds which have an affinity for cotton, are diazotizable on the fiber and are salts of carboxylic acids corresponding probably to the general formula:

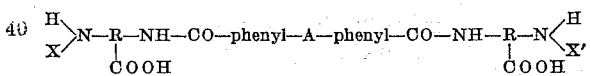

wherein R represents a radicle of a compound of the benzene series or a radicle of the naphthalene series, X and X' stand for hydrogen, or bound to the nitrogen by a —CO— group for a radicle of a compound of the benzene series or a radicle of the naphthalene series, said radicle bearing a terminal NH₂ group, and A represents an atomic linkage of the group consisting of —N=N— and

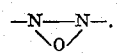

3. As new products the compounds which have an affinity for cotton, are diazotizable on the fiber and are salts of carboxylic acids corresponding probably to the general formula:

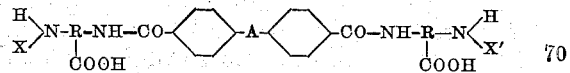

wherein R represents a radicle of a compound of the benzene series or a radicle of the naphthalene series, X and X' stand for hydrogen, or bound to the nitrogen by a —CO— group for a radicle of a compound of the benzene series or a radicle of the naphthalene series, said radicle bearing a terminal NH₂ group, and A represents an atomic linkage of the group consisting of —N=N— and

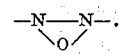

4. As new products the compounds which have an affinity for cotton, are diazotizable on the fiber and are salts of carboxylic acids corresponding probably to the general formula:

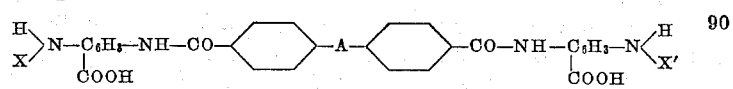

wherein A represents an atomic linkage of the group consisting of the azo- and the azoxy group, and wherein X and X' stand for hydrogen, or bound to the nitrogen by a —CO— group for a radicle of a compound of the benzene series or a radicle of the naphthalene series, said radicle bearing a terminal NH₂ group.

5. As new products the compounds which have an affinity for cotton, are diazotizable on the fiber and are salts of carboxylic acids corresponding probably to the general formula:

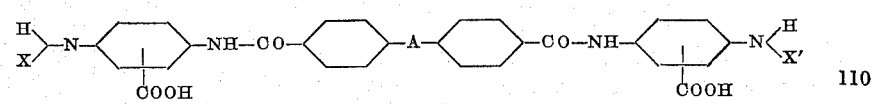

wherein A represents an atomic linkage of the group consising of the azo- and the azoxy group, and wherein X and X' stand for hydrogen or, bound to the nitrogen by a —CO— group for a radicle of a compound of the benzene series or a radicle of the naphthalene series, said radicle bearing a terminal NH₂ group.

6. As new products the compounds which have an affinity for cotton, are diazotizable on the fiber and are salts of carboxylic acids corresponding probably to the general formula:

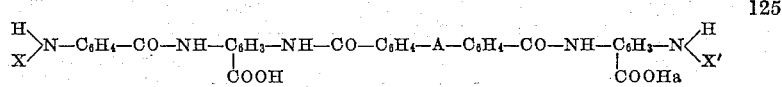

wherein A represents an atomic linkage of the group consisting of the azo- and the azoxy group, and wherein X and X' stand for hydrogen or, bound to the nitrogen by a —CO—group for a radicle of a compound of the benzene series or a radicle of the naphthalene series, said radicle bearing a terminal NH₂ group.

7. As new products the compounds which have an affinity for cotton, are diazotizable on the fiber and are salts of carboxylic acids corresponding probably to the general formula:

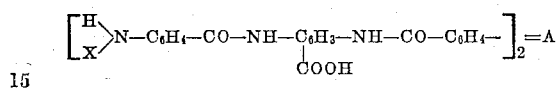

wherein A represents an atomic linkage of the group consisting of the azo- and the azoxy group and wherein X stands for hydrogen or bound to the nitrogen by a —CO— group for a radicle of a compound of the benzene series or a radicle of the naphthalene series, said radicle bearing a terminal NH₂ group.

8. As new products the compounds which have an affinity for cotton, are diazotizable on the fiber and are salts of carboxylic acids corresponding probably to the general formula:

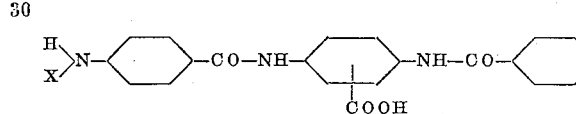

wherein A represents an atomic linkage of the group consisting of the azo- and the azoxy group, and wherein X and X' stand for hydrogen or, bound to the nitrogen by a —CO— group for a radicle of a compound of the benzene series or a radicle of the naphthalene series, said radicle bearing a terminal NH₂ group.

9. As new products the componds which have an affinity for cotton, are diazotizable on the fiber and are salts of carboxylic acids corresponding probably to the general formula:

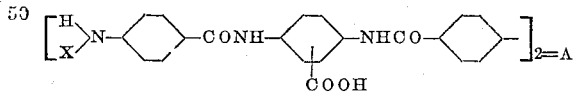

wherein A represents an atomic linkage of the group consisting of the azo- and the azoxy group and wherein X stands for a hydrogen or bound to the nitrogen by a —CO— group for a radicle of a compound of the benzene series or a radicle of the naphthalene series, said radicle bearing a terminal NH₂ group.

10. As new products the compounds which have an affinity for cotton, are diazotizable on the fiber and are salts of carbox-ylic acids corresponding probably to the general formula:

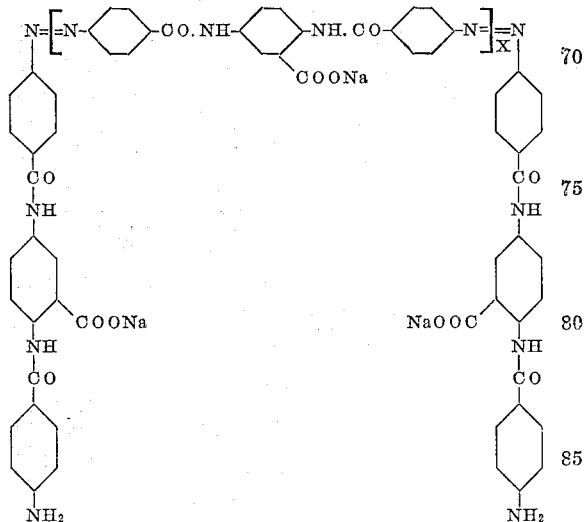

wherein X means 0, 1 or a whole number greater than 1 and wherein —N=N— may be substituted by

11. The process of producing new compounds having an affinity for cotton and being diazotizable on the fiber, which process comprises treating with a reducing agent a compound of the general formula:

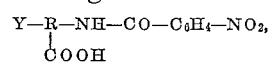

wherein R represents a radicle of a compound of the benzene series or a radicle of the naphthalene series and Y stands for a substituent of the group consisting of —NO₂, —NH₂ and —NH—CO—C₆H₄—NO₂ said reducing agent being present in an amount necessary for a partial reduction of the nitro groups to form an atomic linkage between two molecules of the nitrobenzoyl compound of the group consisting of azo and azoxy.

12. The process of producing new compounds having an affinity for cotton and being diazotizable on the fiber, which process comprises treating with a reducing agent a compound of the general formula:

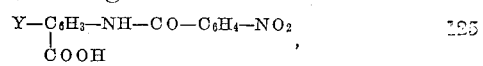

wherein Y stands for a substituent of the group consisting of —NO₂, —NH₂ and —NH—CO—C₆H₄—NO₂, said reducing agent being present in an amount necessary for a partial reduction of the nitro groups to form an atomic linkage between two molecules of the nitrobenzoyl compound of the group consisting of azo and azoxy.

13. The process of producing new compounds having an affinity for cotton and being diazotizable on the fiber, which process comprises treating with a reducing agent a compound of the general formula:

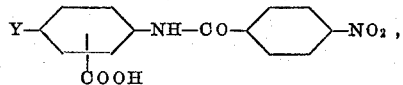

wherein Y stands for a substituent of the group consisting of $-NO_2$, $-NH_2$ and $-NH-CO-C_6H_4-NO_2$, said reducing agent being present in an amount necessary for a partial reduction of the nitro groups to form an atomic linkage between two molecules of the nitrobenzoyl compound of the group consisting of azo and azoxy.

14. The process of producing a new compound having an affinity for cotton and being diazotizable on the fiber, which comprises treating 1.4-di-(4'-nitrobenzoylamino)-benzene carboxylic acid with a reducing agent, said reducing agent being present in an amount necessary for a partial reduction of the nitro groups to form an atomic linkage between two molecules of the nitrobenzoyl compound of the group consisting of azo and azoxy.

15. The process which comprises treating about 47.2 parts by weight of 1.4-di-(4'-nitrobenzoylamino) benzene-2-carboxylic acid in the presence of an excess of a diluted sodium hydroxide solution at room temperature with about 23.5 parts by weight of anhydrous sodium sulfide.

In testimony whereof I affix my signature.
WERNER LANGE.